US008321661B1

(12) United States Patent
Liang et al.

(10) Patent No.: US 8,321,661 B1
(45) Date of Patent: Nov. 27, 2012

(54) INPUT DATA SECURITY PROCESSING SYSTEMS AND METHODS THEREFOR

(75) Inventors: Han-Chang Liang, Taipei (TW); Kun-Hao Liu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 1159 days.

(21) Appl. No.: 12/130,945

(22) Filed: May 30, 2008

(51) Int. Cl.
*H04L 29/06* (2006.01)

(52) U.S. Cl. .......................................................... 713/154

(58) Field of Classification Search .................... 713/154
See application file for complete search history.

(56) References Cited

U.S. PATENT DOCUMENTS

| | | | |
|---|---|---|---|
| 6,986,036 B2* | 1/2006 | Wang et al. | 713/153 |
| 2004/0015725 A1* | 1/2004 | Boneh et al. | 713/201 |
| 2007/0294373 A1* | 12/2007 | Harrison | 709/219 |

* cited by examiner

*Primary Examiner* — Jason Gee
(74) *Attorney, Agent, or Firm* — IPSG, P.C. Intellectual Property Law

(57) ABSTRACT

Methods and apparatus for implementing input data security processing on user input data are disclosed. The user input data is entered on a webpage that contains a destination specification for an intermediary security service and an encrypted destination specification for a receiving module of the application program. The user input data is first sent to the intermediary security service for performing input data security processing on the user input data. If the user input data is deemed acceptable, the user input data is sent to the receiving module by decrypting the encrypted destination specification for the receiving module to obtain the destination specification for the receiving module and transmitting the user data to the receiving module using the destination specification for the receiving module.

21 Claims, 4 Drawing Sheets

INPUT DATA SECURITY PROCESSING SYSTEMS AND METHODS THEREFOR

BACKGROUND OF THE INVENTION

A web-based application is a dynamic application that is accessed via the worldwide web. For example, these web-based applications may provide diverse services such as web mail, blogs, search engines, and discussion boards, etc. As users become more knowledgeable of web-based applications and the functionality of web-based applications, the vulnerabilities of these web-based applications are also known. With these vulnerabilities, the risk of users' sensitive information, users' computer systems, users' computer networks, and/or the worldwide web, etc., being infiltrated or compromised by malicious data, also increases. By way of example, malicious data infiltrating a web-based application may cause a significant amount of damage to other users of the web-based application and/or the web-based application itself. Therefore, detecting and/or blocking the malicious data more efficiently and efficiently is a critical task for individuals and organizations alike.

One technique to detecting malicious data involves the utilization of an input filtering mechanism. An input filtering mechanism may function as a filtering layer between one or more users and the web-based application in order to help inhibit malicious data. Another technique for detecting malicious data requires the user to download a filtering program so that the data can be filtered before it is submitted.

Consider the situation wherein, for example, a user wants to access a web-based blogging application, for example, www.blogwidget.com, in order to input their daily journal entries. The user first enters the URL ("www.blogwidget.com") into the browser's address bar. In order to access the web-based application, the web-based application provider may prompt the user to login by providing a HTML input form, for example, www.blogwidget/login.html, to the user's browser. This HTML input form requires the user to input, for example, their username and password before access is granted to the web-based blogging application.

After the user inputs the required login information into the provided HTML input form and hits "submit", the login data, or the HTML input form data, is then transmitted to a target URL of a receiving module of the web-based application (for example, www.blogwidget/target.cgi) that is specified in the HTML input form. The receiving module of the web-based application would then forward the HTML input form data to the web-based application. It is then up to the web-based application provider to do his own access control, using the login data, to decide whether to grant or deny access by the user to www.blogwidget.com.

If the web-based application provider decides to grant the user access to the web-based application (www.blogwidget.com), the web-based application provider in this example may provide the user with an additional HTML input form, for example, www.blogwidget/journal.html, so that the user can then enter his or her daily journal entry.

Similar to the login HTML input form, once the user inputs his or her daily journal entry into the data fields provided and hits "submit", before the daily journal entry is posted to the blog site, the HTML input form data is first transmitted to a target URL of the receiving module of the web-based application (for example, www.blogwidget/target cgi), that is specified in the journal HTML input form.

The receiving module of the web-based application would then forward the HTML input form data to the web-based application. It is then up to the web-based application provider to do his or her own content filtering or malicious data detection on the entered form data in order to allow or disallow the daily journal entry to be posted on www.blogwidget.com.

Traditionally, for the web-based application provider to perform data filtering of the inputted information by the user, the web-based application provider has to provision (i.e., install and/or maintain and/or update) the data filtering mechanism. Typically, the installation and maintenance of the data filtering mechanism requires specialized programmers to be hired, which can be expensive and time consuming for a typical business.

As the worldwide web continues to evolve, so do the types of malicious threats. Therefore, not only does the web-based application provider initially have to install an input filtering mechanism, but also has to continuously update and maintain the filtering mechanism. The amount of resources required to properly install and maintain such a filtering mechanism may be out of reach for some entities. Similar considerations exist with respect to installing and maintaining the access control mechanism.

As mentioned, an alternative approach requires the user to install and maintain client-based data filtering mechanism and/or access control mechanism to perform data filtering and/or access control at the client browser. However, this approach is not wholly satisfactory since some users may not have the expertise or be diligent in installing and/or maintaining such data filtering mechanism and/or access control mechanism.

SUMMARY OF INVENTION

The invention relates, in one or more embodiments, to a method for implementing input data security processing on user input data, the user input data being inputted via a client browser and configured to be received by an application program. The method includes receiving at an intermediary security service a webpage that includes the user input data, the user web page including a destination specification for the intermediary security service and an encrypted destination specification for a receiving module of the application program, the encrypted destination specification for the receiving module representing an encrypted version of a destination specification for the receiving module. The method also includes performing, using the intermediary security service, input data security processing on the user input data. The method additionally includes forwarding, if the user input data is deemed acceptable, the user input data to the receiving module by decrypting the encrypted destination specification for the receiving module to obtain the destination specification for the receiving module and transmitting the user data to the receiving module using the destination specification for the receiving module.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

To facilitate discussion.

DETAILED DESCRIPTION OF EMBODIMENTS

Figure 1:
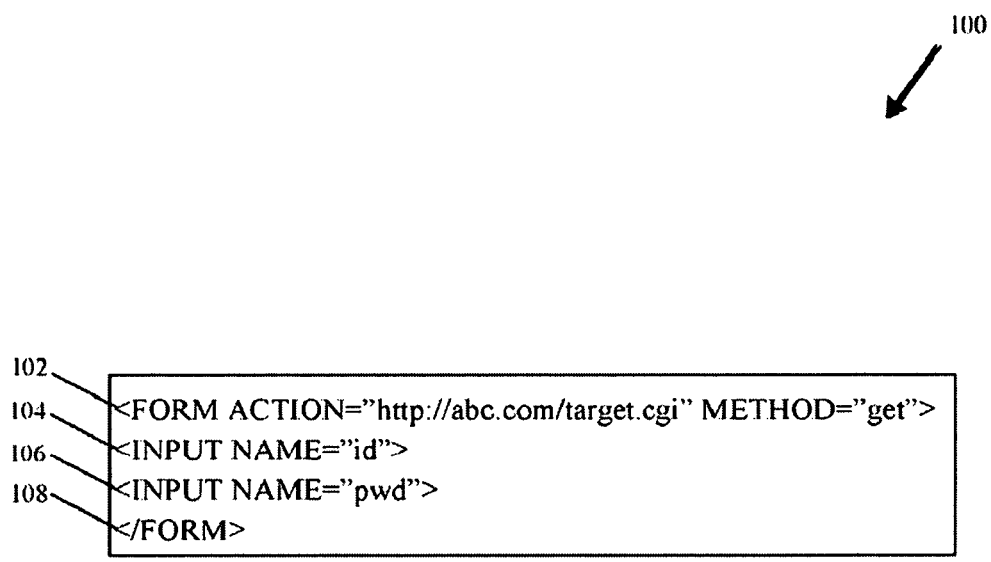
FIG. 1 shows an example of a HTML access control input form, representing an example form typically employed to perform access control on behalf of a web-based application program in the prior art.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to avoid unnecessarily obscuring the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Generally speaking, input data security processing (including data filtering, content filtering, access control, etc.) is desirable to control access and/or to prevent damage due to malicious data. In one aspect of the invention, the inventors herein realize that it is possible to address the aforementioned input data security processing needs by providing an arrangement for transparently and securely redirecting the users input data to an intermediary data security processing component that is capable of being maintained by an entity (or entities) other than end user (who interacts with the client browser) or by the enterprise that manages the client computers for the client users.

In accordance with embodiments of the invention, the input data security processing arrangement and/or technique involve transparently re-directing the input data to an intermediary security service. The destination specification (such as the URL) for this intermediary security service is specified in the code of the input form. The intermediary security service represents the service that performs the input data security processing (such as access control or input data filtering for malicious content).

Also included in the input form is an encrypted destination specification for the receiving module of the web-based application. This destination specification (such as the URL) of the receiving module of the web-based application is encrypted to render the destination specification of the receiving module indecipherable or unusable to the user or a third party upon inspecting the code of the input form. The encryption thus renders it impossible for the user or another third party to bypass the intermediary security service since without knowledge of the destination specification, the user or such third party is unable to submit the input data directly to the receiving module of the web-based application.

The intermediary security service is, however, provided with decryption capability to decrypt the destination specification for the receiving module of the web-based application. If input data security processing results in the input data being deemed acceptable (e.g., free of malicious content), the data may be forwarded to the receiving module of the web-based application for further processing. In the case of access control, the input data security processing service may inform the web-based application and/or the user that access is granted in the case of access control.

On the other hand, if input data security processing results in the input data being deemed unacceptable (e.g., containing malicious or unwanted data), the input data is rejected. In the case of access control, the user and/or the web-based application may be provided with a notice regarding the refusal of access.

To facilitate discussion, FIG. 1 shows an example of a HTML access control input form 100, representing an example form typically employed to perform access control on behalf of a web-based application program in the prior art. The HTML access control input form 100 may be furnished automatically to the user when the user access the web-based application, for example. For discussion purposes, the HTML access control input form 100 is http://abc.com/input.html.

Reference number 102 shows the HTML code that specifies where the HTML input form, after being filled out by the user, may be forwarded so that the user login data may be employed by the web-based application provider to perform access control. In the instant example, the URL of the security receiving module is http://abc.com/target.cgi. Accordingly, the user login data is forwarded to this destination URL so that access control may be performed.

Reference number 104 represents the HTML code that enables the user to input the userid while reference number 106 represents the HTML code that enables the user to input the password. For completeness, reference number 108 represents the HTML code to specify the end of the input form 100.

Figure 2:
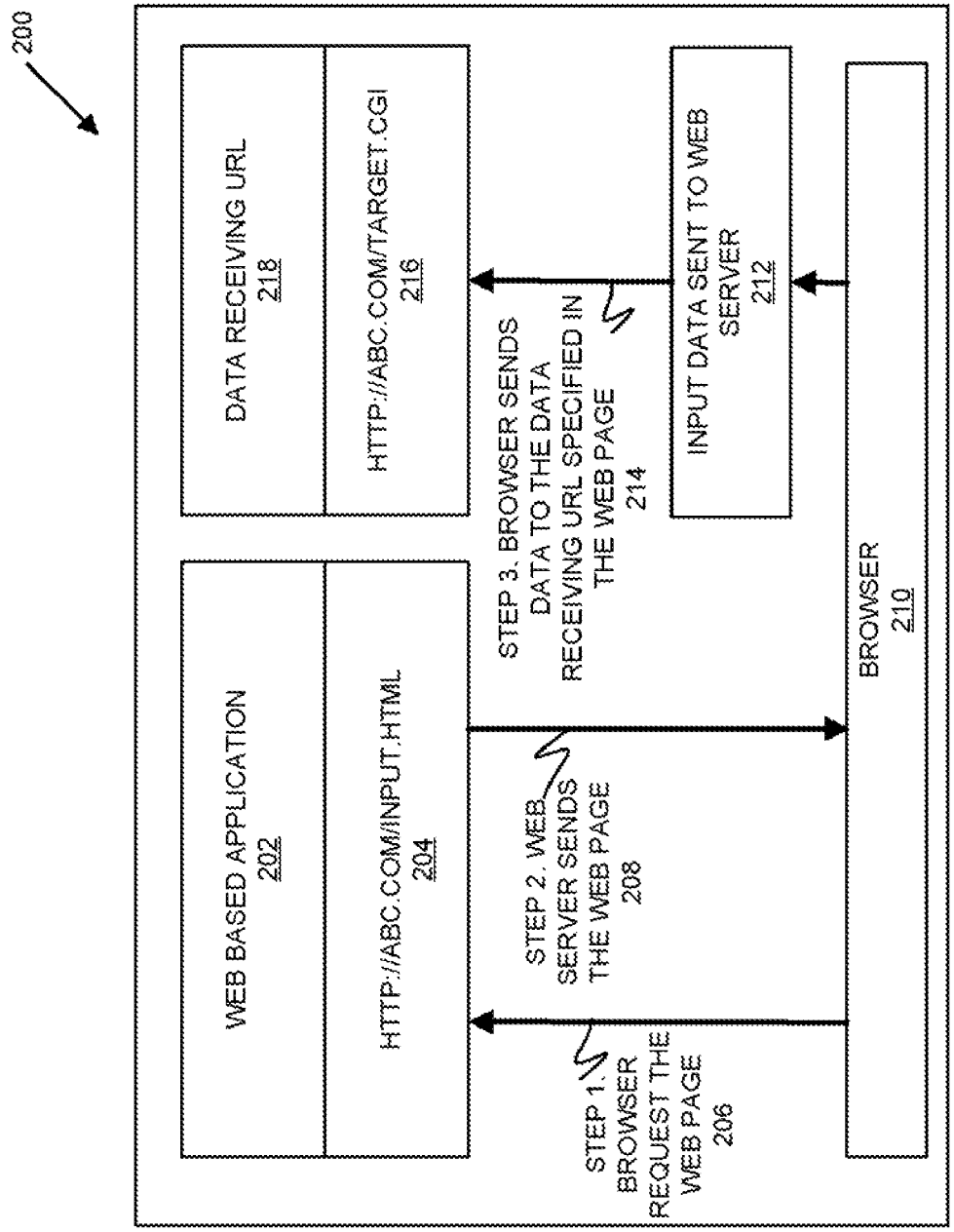
FIG. 2 shows a typical data flow for the submission of input data, such as login data, between a user and a web-based application.

FIG. 2 shows a typical data flow 200 for the submission of input data, such as login data, between a user and a web-based application. Generally speaking, input data is facilitated by the web-based application (202) via an input form that is provided (208) to the user's browser (210) upon request by the browser (206). In the example of FIGS. 1 and 2, the input form is http://abc.com/input.html (204).

The user may then input (212) data, which may be login data (as in the case of the example of FIG. 2) or any other input data (such as blog data, credit card data, textual, audio or graphical data, etc.) if the input form is employed for inputting data instead of for access control purposes. The input data is then forwarded (214) to the web-based application or more specifically to the receiving module (218) of the web-based application, the URL of which (e.g., http://abc.com/target.cgi, reference number 216) is specified in the HTML input form.

Once the input data is received by the receiving module, access control and/or data filtering for malicious data may be performed. As discussed, the input data security processing (e.g., access control and/or data filtering or any other type of data operation) is performed by the web service provider using input data security processing mechanism installed and maintained by the web service provider. Alternatively, input data security processing may be performed by individual client-based mechanisms. As discussed, however, relying on the user or the user's enterprise or the web-based application provider to have adequate resource (e.g., time, money, expertise, etc.) and/or diligence to properly install and maintain the input data security mechanism is risky.

Figure 3:
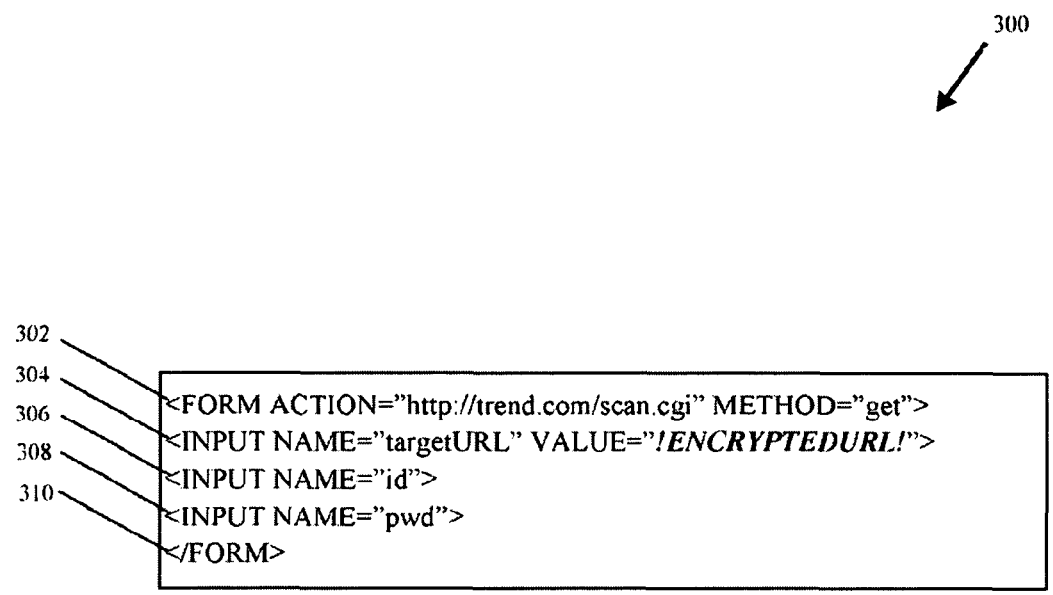
FIG. 3 shows, in accordance with embodiments of the invention, an example input form to facilitate the implementation of the inventive input data security processing.

FIG. 3 shows, in accordance with embodiments of the invention, an example input form to facilitate the implementation of the inventive input data security processing. In this example, HTML is employed to facilitate discussion although the inventive input data security processing may be implemented using any suitable programming language and/or protocol. In FIG. 3, HTML input form 300 represents an example form employed to perform access control on behalf or a web-based application program. However, the input form is not limited to access control purposes and may represent an input form for inputting any type of user data. The HTML input form 300 may be furnished automatically to the user when the user access the web-based application, for example.

Reference number 302 shows the HTML code that specifies where the HTML input form, after being filled out by the user, may be forwarded. Note that unlike the example of FIGS. 1 and 2, the HTML input form that contains the user input data is sent to an intermediary security service instead of being sent to the receiving module of the web-based application. In the example of FIG. 3, the destination specification (URL) for the intermediary security service is http://trend.com/scan.cgi. This intermediary security service may be responsible, in the example of FIG. 3, for performing input data security processing such as scanning the input data for malicious content and/or perform access control HTML input form 300 also contains an encrypted version of the destination specification of the receiving module of the web-based application (304). The encryption renders it impossible for a user or a third party, upon studying the code of HTML input form 300, to ascertain the destination specification of the receiving module of the web-based application. Without knowledge of the destination specification of the receiving module of the web-based application, it is impossible for the user or the third party to bypass the security control provided by the intermediary security service. However, the intermediary security service is provided with decryption capability to decrypt and ascertain the destination specification of the receiving module of the web-based application.

Reference number 306 represents the HTML code that enables the user to input the userid while reference number 308 represents the HTML code that enables the user to input the password. For completeness, reference number 310 represents the HTML code to specify the end of HTML input form 300.

Figure 4:
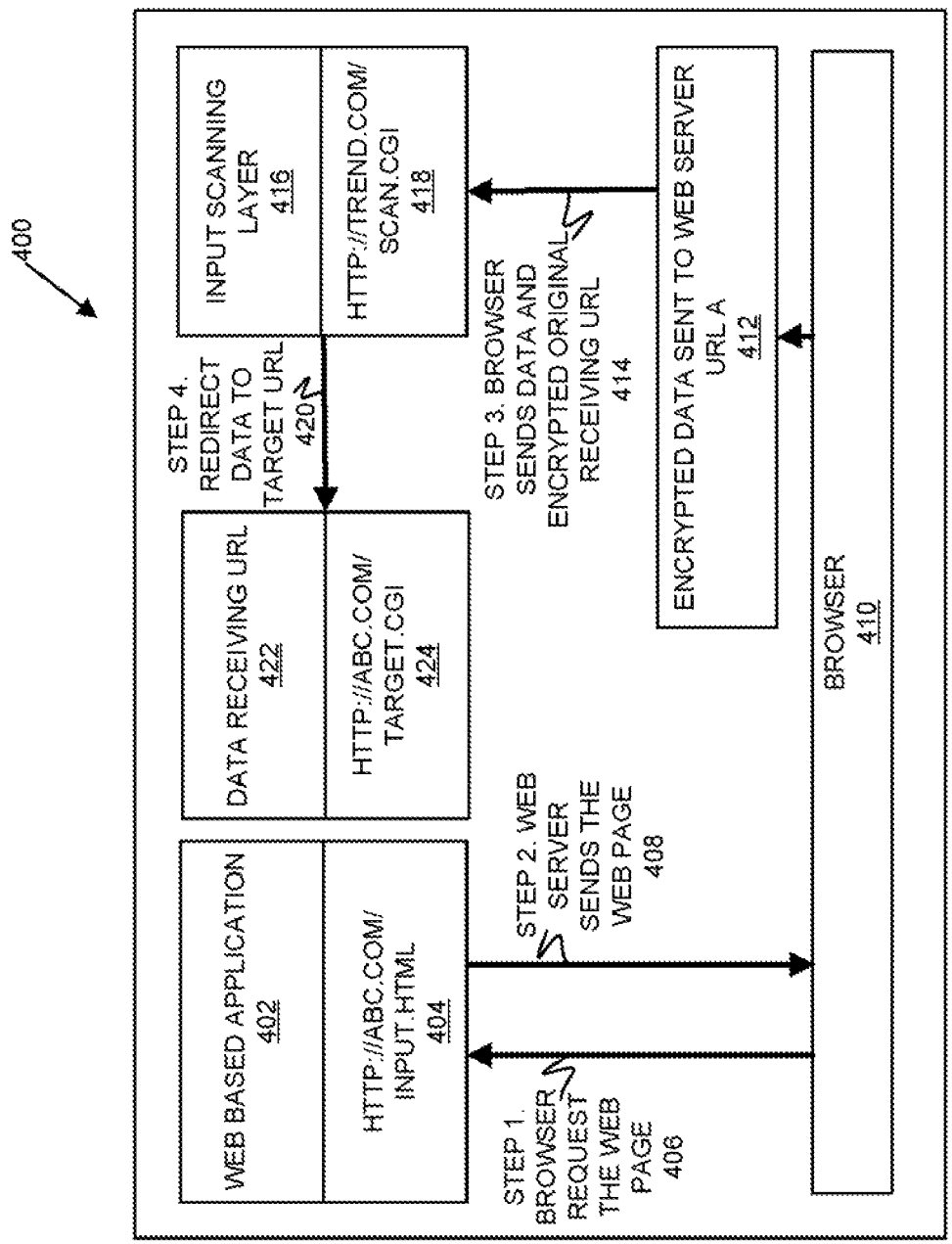
FIG. 4 shows, in accordance with embodiments of the invention, a data flow for the submission of input data, such as login data, between a user and a web-based application.

FIG. 4 shows, in accordance with embodiments of the invention, a data flow 400 for the submission of input data, such as login data, between a user and a web-based application (402). Generally speaking, input data is facilitated by the web-based application via an input form that is provided (408) to the user's browser (410) upon request by the browser (406). In the example of FIGS. 3 and 4, the input form is http://abc.com/input.html (404).

The user may then input data, which may be login data (as in the case of the example of FIG. 3) or any other input data (such as blog data, credit card data, textual, audio or graphical data, etc.) into the HTML input form. The input data is then forwarded (412/414) to the intermediary security service using the destination specification (418) in the HTML input form itself. The input data may be unencrypted or may be encrypted if desired. However, the destination specification for the data receiving module of the web-based application is encrypted, as mentioned.

Once the intermediary security service (416) receives the HTML input form (which includes the user input data at this point), the intermediary security service may perform input data security processing on the input data. The security processing may include access control (e.g., determining whether the user is authorized to access the web-based application or to another application), content filtering (e.g., determining whether the input data contains malicious or unwanted data), and/or classification (e.g., determining the classification or category of the user input data and/or the data requested by the user via the user input data). The aforementioned examples of data input security processing are not intended to be limiting since any type of data input security processing may be accomplished using the techniques discussed herein.

In accordance with embodiments of the invention, the intermediary security service is provided via the internet by a third party other than the user or the entity that manages the computers of the organization of which the user is a member or the entity that provides the web-based application. For example, if the user is an employee for a given company or organization, the intermediary security service may be maintained and updated by a firm that specializes in providing security processing service (which may be a different entity than the entity that provides the web-based application).

The intermediary security service may be provided using any suitable hardware and/or software platform (such as web server, database engine, etc.) that can provide such security processing via the internet. In this manner, the burden of installing, maintaining and/or updating the security services (e.g., access control, content filtering, classification, etc.) is removed from the user and/or the company that employs the user and/or the entity that provides the web-based application service.

If the intermediary security service involves data filtering or classification, the intermediary security service may scan the input data to ascertain whether the input data may be permitted to be forwarded to receiving module of the web-based application. If the intermediary security service involves access control, the intermediary security service may decide whether the user is permitted to access the web-based application or another application specified by the input data. These examples are not meant to be limiting of the types of security services that may be offered on behalf of the user and/or the web-based application provider.

For example, if the input data is deemed to be free of malicious content, the intermediary security service may then forward (420) the data to the receiving module of the web-based application using the destination specification (e.g., URL). As another example, if the user login data is acceptable, the user login data may be furnished to the receiving module of the web-based application to enable further processing.

On the other hand, if for example the input data is deemed to contain malicious content, the intermediary security service may reject the input data. In one or more embodiments, a notification may be provided to the user and/or the user's organization and/or the web-based application provider to notify of the detection of malicious data and the refusal of the input data. As another example, if the user login data is unacceptable, the user may be denied access (in which case, the login data may be forwarded to the web-based application provider for record-keeping or may be discarded altogether by the intermediary security service.

As can be appreciated from the foregoing, embodiments of the invention transparently and securely provide security service for input data on behalf of users, user's organization and/or the web-based application provider. By employing the redirecting mechanism, embodiments of the invention leverage on the expertise of security specialists and relieve the user, the user's organization and/or the web-based application provider of the burden to install, maintain, and/or update the security service mechanisms. By encrypting the destination specification of the receiving module of the web-based application and providing the encrypted destination specification in the input form, embodiments of the invention advantageously ensure that acceptable input data is correctly routed to the receiving module of the web-based application (if such routing is deemed permitted) while eliminating the possibility of users and/or hackers bypassing the security services provided by the intermediary security services.

While this invention has been described in terms of several embodiments, there are alterations, permutations, and equivalents, which fall within the scope of this invention. It should also be noted that there are many alternative ways of implementing the methods and apparatuses of the present invention. Additionally, it is intended that the abstract section, having a limit to the number of words that can be provided, be furnished for convenience to the reader and not to be construed as limiting of the claims herein. It is therefore intended that the following appended claims be interpreted as including all such alterations, permutations, and equivalents as fall within the true spirit and scope of the present invention.

What is claimed is:

1. A method for implementing input data security processing on user input data, said user input data being inputted via a client browser and configured to be received by an application program, comprising:
    receiving at an intermediary security service a webpage that includes said user input data, said user web page including a destination specification for said intermediary security service and an encrypted destination specification for a receiving module of said application program, said encrypted destination specification for said receiving module representing a destination specification for said receiving module;
    performing, using said intermediary security service, input data security processing on said user input data; and
    when said user input data is deemed acceptable, forwarding said user input data to said receiving module by decrypting said encrypted destination specification for said receiving module to obtain said destination specification for said receiving module and transmitting said user data to said receiving module using said destination specification for said receiving module.

2. The method of claim 1 wherein said application program represents a web-based application program.

3. The method of claim 1 wherein said destination specification for said intermediate security service represents a URL (Uniform Resource Locator) for said intermediary security service.

4. The method of claim 1 wherein said destination specification for said receiving module represents a URL (Uniform Resource Locator) for said receiving module.

5. The method of claim 1 wherein said intermediary security service represents a malware scanning engine.

6. The method of claim 1 wherein said intermediary security service implements a content classification engine.

7. The method of claim 1 wherein said web page represents an HTML web page.

8. The method of claim 1 wherein said intermediary security service is implemented on a server that is coupled to a server implementing said application program via the Internet.

9. The method of claim 1 further comprising rejecting said user input data when said user input data is deemed unacceptable response to said input data security processing.

10. The method of claim 9 further comprising providing a warning message to said client browser if said user input data is deemed unacceptable.

11. A method for implementing input data security processing on user input data, said user input data being inputted via a client browser and configured to be received by an application program, comprising:
    receiving at an intermediary security service a webpage that includes said user input data, said user web page including a destination specification for said intermediary security service and an encrypted destination specification for a receiving module of said application program, said encrypted destination specification for said receiving module representing a destination specification for said receiving module;
    performing, using said intermediary security service, input data security processing on said user input data, said input data security service implementing access control with respect to said application program; and
    when said user input data satisfies access control one or more access control criteria, forwarding said user input data to said receiving module by decrypting said encrypted destination specification for said receiving module to obtain said destination specification for said receiving module and transmitting said user data to said receiving module using said destination specification for said receiving module.

12. The method of claim 11 wherein said destination specification for said intermediate security service represents a URL (Uniform Resource Locator) for said intermediary security service.

13. The method of claim 11 wherein said destination specification for said receiving module represents a URL (Uniform Resource Locator) for said receiving module.

14. The method of claim 11 wherein said user input data includes at least one of a userid and a password.

15. The method of claim 11 wherein said web page represents a HTML web page.

16. The method of claim 11 wherein said intermediary security service is implemented on a server that is coupled to a server implementing said application program via the Internet.

17. The method of claim 11 further comprising rejecting said user input data if said user input data is deemed unacceptable response to said input data security processing.

18. The method of claim 17 further comprising providing a warning message to said client browser if said user input data is deemed unacceptable.

19. The method of claim 11 wherein said intermediary security service is implemented on a first computer that is different from a computer employed to execute said client browser, said first computer also is different from a computer that executes said application program via the Internet.

20. A method for implementing input data security processing on user input data, said user input data being inputted via a client browser and configured to be received by an application program, comprising:
    transmitting from said application program to said browser a webpage, said webpage being configured for receiving said user input data, said webpage including a destination specification for an intermediary security service and an encrypted destination specification for a receiving module of said application program, said encrypted destination specification for said receiving module representing a destination specification for said receiving module; and receiving said user input data from said intermediary security service when said user input data is deemed acceptable after input data security processing is performed by said intermediary security service on said user input data, said user input data being forwarded from said intermediary security service to said receiving module using said destination specification for said receiving module, said destination specification for said receiving module is decrypted by said intermediary security service from said encrypted destination specification for said receiving module.

21. The method of claim 20 wherein said intermediary security service implements at least one of access control to said application program and content scanning.

* * * * *